United States Patent Office 2,800,502
Patented July 23, 1957

2,800,502

SYNTHESIS OF BETAINE HYDRATE

Bruno Vassel, Deerfield, Ill., assignor to International Minerals & Chemical Corporation, a corporation of New York No Drawing. Application November 23, 1953, Serial No. 393,951

3 Claims. (Cl. 260—501)

The instant invention relates to the synthesis of certain quaternary ammonium compounds. More particularly, it relates to an improved synthesis of betaine hydrate.

In the past, betaine hydrate has been obtained from betaine acid addition salts, such as betaine hydrochloride or sulfate. For example, betaine hydrochloride was synthesized by heating trimethylamine with an alcoholic solution of chloroacetic acid to produce betaine hydrochloride, and was converted to the hydrate with silver oxide or silver carbonate. (Liebreich, Ber. 2, 13 and 167, 1869; Ber. 3, 161, 1870; Willstatter, Ber. 35, 603; Koeppen, Ber. 38, 167.) Known methods are not commercially feasible for large scale production because betaine hydrate is not produced directly, and the conversion of the betaine hydrochloride to the hydrate, which involves use of the silver oxide or carbonate, is expensive and tedious.

It is an object of the instant invention to provide improved synthesis of certain quaternary ammonium compounds.

It is a further object of the instant invention to provide a direct synthesis of betaine hydrate.

It is a further object of the instant invention to provide commercially feasible processes for the production of betaine hydrate.

It is a further object of the instant invention to provide a process for the production of betaine hydrate from haloacetic acid and trimethylamine and wherein there are no substantial amounts of secondary products produced by the process.

These and other objects of the instant invention will become more apparent as hereinafter described.

Certain quaternary ammonium compounds are synthesized by the reaction of a haloacetic acid with a water-soluble trialkylamine which has a boiling point lower than 100° C. For example, betaine hydrate is synthesized by the reaction of haloacetic acid with trimethylamine in the presence of a large molar excess of trimethylamine. The resulting reaction mixture is contacted with a strong anion exchange resin, and the trimethylamine is removed from the effluent therefrom, for example by distillation. The product is crystallized from the residue from which the trimethylamine has been removed. Trimethylamine can be substantially completely recovered and recycled to the reaction with the haloacetic acid.

In one embodiment of the instant invention, about 1 mole of the trialkylamine, such as trimethylamine or triethylamine, in aqueous solution is reacted with about 1 mole of haloacetic acid, such as chloroacetic acid, bromoacetic acid or iodoacetic acid, in the presence of at least 1 additional mole or even 2 additional moles of the trialkylamine over that required to react with the haloacetic acid. When trimethylamine is employed, the resulting mixture contains betaine hydrate, trimethylamine hydrogen halide and trimethylamine. The free trimethylamine is separated from the reaction products, for example by evaporation or distillation, and the resulting solution containing betaine hydrate and trimethylamine hydrogen halide is subjected to anion exchange treatment which removes the halogen ion from the mixture.

Commercially available strong anion exchange materials are suitable for use in this ion exchange treatment, for example Dowex 1 or Dowex 2 by Dow Chemical Corporation, or Amberlite IRA 400 or IRA 410 by Rohm & Haas, can be employed. Most of these and other known anion exchange resins are prepared by the polymerization of aromatic amines and formaldehyde or a polyamine, a phenol and formaldehyde. Dowex 1 and 2 are polystyrene divinyl benzene resins, containing quaternary amines.

The effluent from the anion exchange treatment contains betaine hydrate and free trimethylamine. The trimethylamine is volatile and can be separated from the betaine hydrate, for example by distillation of the solution. Betaine hydrate is crystallized from the aqueous residue remaining.

If an acid addition salt of betaine, rather than the betaine hydrate is desired, the acid is added to the aqueous effluent from which the trimethylamine has been removed and which contains the hydrate. For example, to produce betaine hydrochloride, hydrochloric acid is added to the aqueous betaine hydrate solution.

In a more specific embodiment of the instant invention, between about 2 moles and about 3 moles, preferably about 2.2 moles of trimethylamine in an aqueous solution having a concentration between about 10% and about the saturation concentration of trimethylamine, preferably between about 15% and about 20%, is admixed with about 1 mole of the haloacetic acid, preferably chloroacetic acid. The reaction is exothermic and after the heating action of the mixture has subsided, the free trimethylamine is separated from the reaction products by distillation. The remaining solution is diluted with water to a concentration appropriate for anion exchange treatment, for example to between about 1% and about 6% hydrochloric acid concentration, preferably between about 3.5% and about 4.0% hydrochloric acid concentration. The diluted solution is contacted with a conventional strong anion exchange resin for the removal of the chlorine ion. Trimethylamine is separated from the effluent from the anion exchange treatment, for example by distillation, and betaine hydrate crystallizes from the residue upon further concentration. The yield of betaine hydrate is generally between about 90% and about 100%.

In carrying out the instant novel process between about 2 moles and about 3 moles of trimethylamine are present in the reaction mixture for each mole of haloacetic acid. Actually, 1 mole of trimethylamine is required for the reaction in which betaine hydrate is formed. The excess of trimethylamine employed results in the formation of a mixture of reaction products from which high yields of betaine hydrate can readily be separated and substantially all of this excess trimethylamine is recovered, for example by distillation, and is recycled to the reaction of the trimethylamine with the haloacetic acid. For example, the trimethylamine distillates are combined, admixed with an alkali metal hydroxide, such as sodium hydroxide, potassium hydroxide or lithium hydroxide. Between about 1 mole and about 5 moles of sodium hydroxide, preferably about 1.1 moles of sodium hydroxide are added to about 1 mole of trimethylamine, and the resulting mixture is heated to a temperature between about 60° C. and about 100° C. The resulting mixture is distilled, and all or any portion of the trimethylamine collected as the distillate is recycled. The trimethylamine can alternately be distilled into sufficient water to obtain a distillate comprising about a 20% aqueous solution of trimethylamine which is recycled to the reaction mixture containing the haloacetic acid. The sodium hydroxide solution remaining is used for the regeneration of the anion exchange resin.

The following example is presented in order to afford a clearer understanding of the practice of the instant invention, but it is understood that it is illustrative only and there is no intention to limit the invention thereto.

*Example*

About 94.5 grams of chloroacetic acid (1 mole) was added to about 782 cc. of about 15% aqueous trimethylamine (2.2 moles). The reaction was allowed to proceed for about one hour, during which time the temperature rose to between about 50° C. and about 60°. About 165 cc. of the reaction mixture was distilled at atmospheric pressure to remove the free trimethylamine. The remaining solution was diluted to about 1000 cc. and put through the strong anion exchange resin Amberlite IRA 410, produced by Rohm and Haas Corporation. The effluent from the anion exchange treatment was distilled, and the cooled distillate containing trimethylamine was collected. Betaine hydrate crystallized from the undistilled portion upon further concentration under reduced pressure. About 110 grams of betaine hydrate, which is a yield of about 94%, was obtained.

The combined trimethylamine distillates were treated with about 44 grams of solid sodium hydroxide with agitation and heating to a temperature of about 100° C. About 133 cc. of this solution was then distilled into about 330 cc. of water in a cold water bath. The resulting aqueous solution contained about 20% trimethylamine and was used for reaction with chloroacetic acid in a subsequent batch. The sodium hydroxide solution remaining after the distillation was diluted to about 4% and used for the regeneration of the anion exchange material.

Having thus fully described and illustrated the character of the instant invention, what is desired to be protected by Letters Patent is:

1. A process for the synthesis of a betaine hydrate which comprises reacting a trialkylamine with a haloacetic acid in aqueous solution in a molar ratio of at least 2:1, said trialkylamine being selected from the group consisting of trimethylamine and triethylamine, subjecting the resulting solution to treatment with a strong anion exchange material, whereby halide ions are substantially completely removed theerfrom, distilling trialkylamine out of the effluent from the anion exchange treatment, and crystallizing the betaine hydrate from the treated solution.

2. A process for the synthesis of betaine hydrate which comprises reacting trimethylamine with chloroacetic acid in aqueous solution in a molar ratio between about 2:1 and about 3:1, contacting the resulting solution with a strong anion exchange material, whereby chloride ions are substantially completely removed therefrom, distilling trimethylamine out of the effluent from the anion exchange treatment, and crystallizing betaine hydrate from the treated solution.

3. A process for the synthesis of betaine hydrate which comprises admixing an aqueous solution containing between about 15 and about 20% by weight of trimethylamine with chloroacetic acid in a molar ratio of trimethylamine to chloroacetic acid between about 2.2:1 and about 3:1, allowing the exothermic reaction to proceed to substantial completion, distilling unreacted trimethylamine from the resulting reaction product, diluting the resulting solution to a chloride concentration between about 1 and about 6% by weight, calculated as HCl, contacting the diluted solution with a strong anion exchange material, whereby chlorides are removed substantially completely from said solution, distilling trimethylamine out of the effluent from the anion exchange treatment, concentrating the treated solution, and crystallizing betaine hydrate therefrom.

References Cited in the file of this patent

UNITED STATES PATENTS

| | | |
|---|---|---|
| 2,128,264 | Downing et al. | Sept. 6, 1938 |
| 2,375,164 | Bennett | May 1, 1945 |

FOREIGN PATENTS

| | | |
|---|---|---|
| 15,162 | Great Britain | Sept. 13, 1913 |